United States Patent
Furukawa et al.

(10) Patent No.: US 8,335,377 B2
(45) Date of Patent: Dec. 18, 2012

(54) LINE DRAWING PROCESSOR, LINE DRAWING PROCESSING METHOD, AND PROGRAM THEREFOR

(75) Inventors: Itaru Furukawa, Kyoto (JP); Tsuyoshi Kubota, Kyoto (JP)

(73) Assignee: Dainippon Screen MFG Co., Ltd., Kyoto (JP)

( * ) Notice: Subject to any disclaimer, the term of this patent is extended or adjusted under 35 U.S.C. 154(b) by 953 days.

(21) Appl. No.: 12/401,066

(22) Filed: Mar. 10, 2009

(65) Prior Publication Data
US 2009/0263042 A1    Oct. 22, 2009

(30) Foreign Application Priority Data
Apr. 21, 2008   (JP) ................... 2008-110134

(51) Int. Cl.
*G06K 9/00*    (2006.01)
(52) U.S. Cl. .................................................. 382/167
(58) Field of Classification Search ............. 382/162, 382/164, 257, 258, 167
See application file for complete search history.

(56) References Cited

U.S. PATENT DOCUMENTS

| | | | |
|---|---|---|---|
| 5,201,011 A * | 4/1993 | Bloomberg et al. | 382/175 |
| 5,537,522 A * | 7/1996 | Shibuta et al. | 345/619 |
| 6,147,691 A | 11/2000 | Takahashi | |
| 6,522,329 B1 * | 2/2003 | Ihara et al. | 345/441 |

FOREIGN PATENT DOCUMENTS

| | | |
|---|---|---|
| JP | 4-141782 A | 5/1992 |
| JP | 10-293855 | 11/1998 |
| JP | 2001-250104 A | 9/2001 |
| JP | 2005-031818 A | 2/2005 |
| JP | 2008-065379 A | 3/2008 |

OTHER PUBLICATIONS

Gangnet et al. ("Automatic Gap Closing for Freehand Drawing," SIGRAPH'94, 1994).*
Fekete et al. ("TicTacToon—a paperless system for professional 2D animation," Proceedings 22nd conference on Computer graphics and interactive techniques Sep. 1995).*
Japanese Decision of Grant issued in Japanese application No. 2008-110134 dated Mar. 15, 2012.

* cited by examiner

*Primary Examiner* — Yubin Hung
(74) *Attorney, Agent, or Firm* — McDermott Will & Emery LLP

(57) ABSTRACT

Based on an input operation by an operator, a line drawing processor sets a designated region and sets identification points in the designated region to generate first and second identification data, each data representing a colored pixel cluster linked to each of the identification points. The line drawing processor further extracts at least one closed region that is not colored in the second identification data and makes a comparison in area between each closed region and the pixel cluster colored in the second identification data to determine whether the closed region requires coloring or not. For line drawing data, the line drawing processor then applies the same color to the pixel cluster identified in the second identification data and the closed region determined to require coloring.

10 Claims, 11 Drawing Sheets

LINE DRAWING PROCESSOR, LINE DRAWING PROCESSING METHOD, AND PROGRAM THEREFOR

BACKGROUND OF THE INVENTION

1. Field of the Invention

The present invention relates to a technique for processing a line drawing, and in particular to a technique for applying color to a line drawing.

2. Description of the Background Art

Japanese manga is one of typical examples of monochrome (uncolored) line drawings. Generally different from American and European comics, manga is a monochrome line drawing having Japanese distinct characteristics. In other words, manga expresses shades of gray (gradation) and characters' feeling by the use of patterns such as various kinds of dots, solid fills (painting a given range with a single color without any clearance left), and effective lines; and drawing lines such as contours. Manga is thus quite different in property from comics which are mostly presented in colors.

Conventionally, manga supplied to the market is printed in paper. Because of the high cost of color printing, manga has been created only in monochrome, except opening color pages of magazines and the like in Japan.

However, with recent development of communications technology using cellular phones or other terminal equipment, there is a rapidly increasing number of websites from which digitized manga is available over communication lines, and as a result, there is a greater number of opportunities to see manga on LCD monitors or the like. This is followed by the increasing demand for colored manga. In addition, since people in countries outside Japan are unfamiliar with monochrome manga, it is preferable to apply color to monochrome manga in order to expand the manga business internationally.

In the process of applying color to a line drawing such as manga, an operator performs a given operation while visually checking a digitized line drawing in the form of digital data displayed on a monitor, to thereby select and apply color to a specific range of an image. Such a coloring operation, however, has taken an enormous amount of time because manga or the like often contains a dotted screen tone of tiny dots applied, a number of thin drawing lines, and a number of line disconnections in drawing lines indicating contours.

In this way, for the manual coloring of a line drawing by the operator, a number of complicated process steps are required, so that there is a need for a technique for automating the coloring process. There have been so far several techniques for semi-automating the coloring process (e.g., Japanese Patent Application Laid-open No. 10-293855.)

For example, Japanese Patent Application Laid-open No. 10-293855 discloses a technique for setting a central pixel in a line drawing and applying color to a circular region of a given radius with the central pixel as the center. More specifically, the radius of the above circular region is determined based on the result of measurement of distances from the central pixel to edges (e.g., drawling lines) in a plurality of directions.

In the above technique, however, for a region with a number of thin drawing lines (e.g., a "face" region including forelock hairs drawn in detail), a number of thin drawing lines may be detected as edges. Thus, it is difficult to color gaps between those drawing lines.

Also in the above technique, only the edges in a plurality of directions with reference to the central pixel are detected, which may result in excessive coloring beyond the range intended by the operator. It is thus necessary for the operator to monitor the conditions of coloring and, if there is any problem, to stop the coloring process as needed.

In many cases, manga often contains a number of breaks (line disconnections) in drawing lines. For example, considering two (or more) regions with a line-disconnection-containing drawing line sandwiched therebetween, it is preferable in some cases to apply different colors to those regions and in other cases to apply the same color to those regions as a single region. To be more specific, when the contour drawn between the "face" and "neck" of a character in a manga includes any line disconnection, the same skin color may be applied to the face and neck regions in some cases. However, since in the above technique, line disconnections are not taken into consideration, it is difficult to apply, at a time, the same color to a plurality of regions with a line-disconnection-containing drawing line sandwiched therebetween.

SUMMARY OF THE INVENTION

The present invention is directed to a line drawing processor for applying color to a line drawing.

According to the present invention, the line drawing processor for applying color to a line drawing includes: an acquisition part acquiring line drawing data; a line-disconnection correcting part correcting line drawing data representing a line drawing for a line disconnection in the line drawing to generate corrected image data; a designated-region setting part setting, for either the line drawing data or the corrected image data, a designated region within an area to be colored, based on a given input operation; an identification-point setting part setting, for the corrected image data, an identification point within each unit closed region which forms a corresponding part of the designated region; and a region coloring part applying a specific color to a pixel cluster linked to the identification point in an entire image area.

Since the designated region is set so as to include at least part of a region (e.g., a relatively small region defined by a plurality of thin drawing lines or the like) to be included within the range of coloring, the setting of the designated region allows the small region to be colored like a relatively large region. Even for a region including a number of thin drawing lines, it is possible to apply color to gaps between those thin drawing lines. That is, efficient coloring is possible through a simple and easy input operation.

Preferably, the identification-point setting part sets, for both the line drawing data and the corrected image data, an identification point within a unit closed region which forms a corresponding part of the designated region. The line drawing processor further includes: a pixel-cluster identification part generating first identification data for the line drawing data and second identification data for the corrected image data, the first and second identification data identifying both a pixel cluster linked to the identification point and the remaining region other than the pixel cluster from the entire image area; a region extraction part obtaining a differential region between the pixel cluster identified in the first identification data and in the second identification data to extract at least one closed region included in the differential region from the corrected image data; and a determination part determining whether each of the at least one closed region requires coloring or not, based on a given criterion. The region coloring part applies the same specific color to any of the at least one closed region determined by the determination part to require coloring and the pixel cluster identified in the second identification data.

Whether a region is to be colored automatically or not is determined based on both a line drawing including a line disconnection and a corrected image corrected for the line disconnection. This enables high-precision and high-efficiency coloring.

Preferably, the pixel-cluster identification part applies coloring to the pixel cluster to distinguish the pixel cluster from the remaining region for each of the line drawing data and the corrected image data.

This allows the operator to easily check the course of processing performed by the line drawing processor and tones of color.

Preferably, the determination part determines whether the coloring is required or not based on a comparison in area between the pixel cluster identified in the second identification data and each of the at least one closed region.

The comparison in area makes it easy to determine whether coloring is required or not.

Preferably, the designated-region setting part sets a designated region defined by a curve in the specific color.

By defining the designated region by a curve in a specific color applied to a line drawing, the operator can easily designate a color to be used for coloring as well as can easily check whether the specific color is suitable for the designated region or not, prior to the application of color using the region coloring element.

Preferably, the identification-point setting part regards each closed region defined by a curve defining the designated region and a drawing line included in the designated region as the unit closed region, and sets a centroid of each unit closed region as the identification point.

Setting the position of a centroid as an identification point facilitates the setting of an identification point.

Preferably, the identification-point setting part divides the designated region into a plurality of sections and sets an identification point for each of the plurality of sections.

This prevents an identification point from being set outside the designated region. Thus, a reference point to be the basis for coloring can be set with reliability within the designated region. This improves the accuracy of coloring.

Preferably, the identification-point setting part includes: a sub-region designation part designating a sub-region lopsided in a given direction within the designated region, and the identification-point setting part sets the identification point within the sub-region.

This further narrows down the range of a region within which an identification point should be set, thus further improving the accuracy of coloring.

Preferably, the line-disconnection correcting part includes an expansion part expanding a drawing line included in the line drawing data at a given rate.

This expansion facilitates the correction of a line drawing for a line disconnection.

The present invention is also directed to a coloring method for applying color to a line drawing.

The present invention is still also directed to a program readable by a computer, the computer reading the program to thereby serve as a line drawing processor for applying color to a line drawing.

It is thus an object of the present invention to provide a technique for achieving high-precision and high-efficiency coloring through a simple and easy input operation by an operator.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinbelow, preferred embodiments of the present invention are described in detail with reference to the accompanying drawing. The term "line drawings" as used in this specification include not only images represented by only finite-length lines (more specifically, contours, etc.) but also images including drawing elements, such as dots or solid fills, other than lines.

1. First Preferred Embodiment 1.1. Configuration and Function of Line Drawing Processor 1

(General Configuration)

Figure 1:
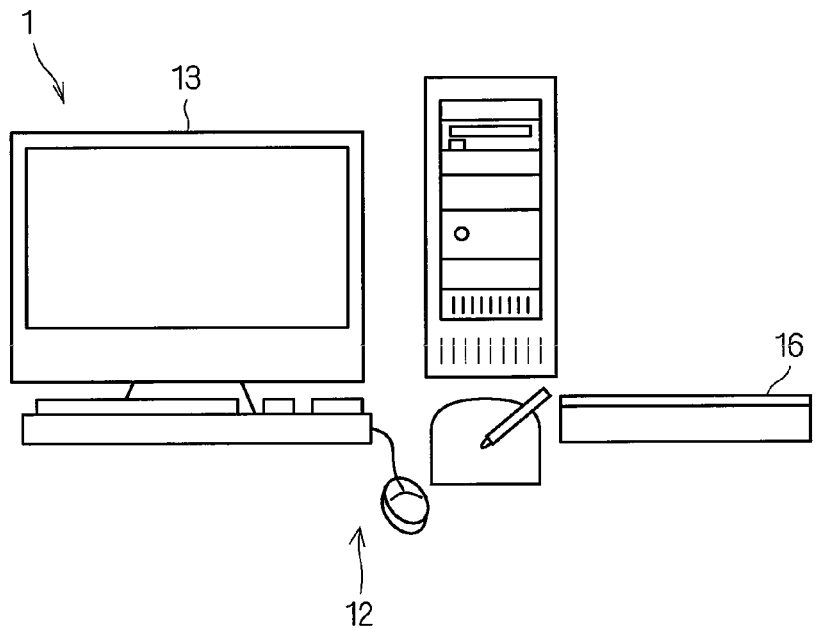
FIG. 1 is an external view of a line drawing processor according to a first preferred embodiment of the present invention.
Figure 2:
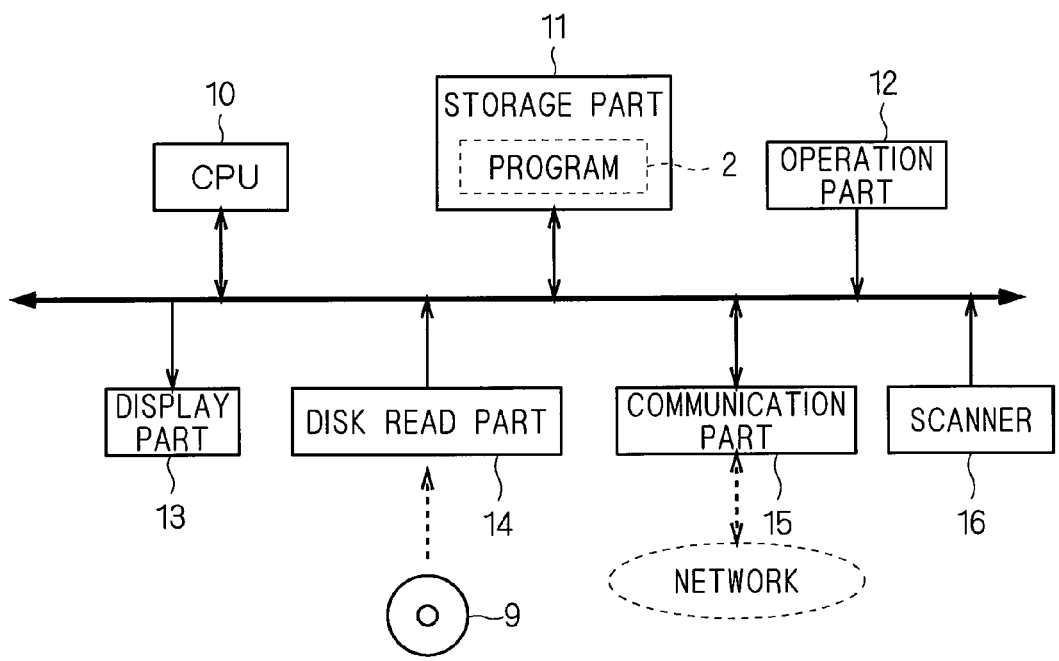
FIG. 2 illustrates a configuration of the line drawing processor.

FIG. 1 is an external view of a line drawing processor 1 according to a first preferred embodiment of the present invention. FIG. 2 illustrates a configuration of the line drawing processor 1.

The line drawing processor 1 mainly includes a CPU 10, a storage part 11, an operation part 12, a display part 13, a disk read part 14, a communication part 15, and a scanner 16; it serves as a general computer (information processor).

The CPU 10 operates according to a program 2 stored in the storage part 11 to implement computation of various kinds of data and generation of control signals, thereby controlling each part of the line drawing processor 1. The functional blocks implemented by the CPU 10 will be described later.

The storage part 11 includes a RAM and a hard disk which are used as a temporary working area of the CPU 10, and a ROM (not shown). The storage part 11 serves as a recording medium for storing the program 2 and various kinds of data. The program 2 may be transferred from a storage medium 9 described later via the disk read part 14 to the storage part 11. As another alternative, the program 2 may be transferred via the communication part 15 to the storage part 11.

The operation part 12 is used for input of user's commands to the line drawing processor 1. In other words, the operation part 12 serves as an input device in the line drawing processor 1. More specifically, the operation part 12 corresponds to, for example, a keyboard, and a pointing device such as a mouse, a pen tablet (a graphics tablet), and various kinds of buttons.

The display part 13 displays various kinds of data in the form of an image on the screen. In other words, the display part 13 serves as a display device in the line drawing processor 1. More specifically, the display part 13 corresponds to, for example, a CRT monitor or a liquid crystal display; it may, like a touch-panel display, has part of the function of the operation part 12.

The disk read part 14 is a device for reading and transferring data stored in the portable storage medium 9 to the storage part 11. In other words, the disk read part 14 serves as a data input device in the line drawing processor 1.

The line drawing processor 1 according to the present preferred embodiment includes a CD-ROM drive as the disk read part 14. The disk read part 14 is, however, not limited thereto and may for example be an FD drive, a DVD drive, an MO device, or the like. When having the function of recording data on the storage medium 9, the disk read part 14 may also carry out part of the function of the storage part 11.

The communication part 15 carries out communications via a network between the line drawing processor 1 and a group of other devices not shown. The line drawing processor 1 is capable of acquiring various kinds of data through the network.

The scanner 16 is a read device for reading a line drawing; it includes a number of image sensors and has the function of acquiring an analog line drawing as digital data.

Figure 3:
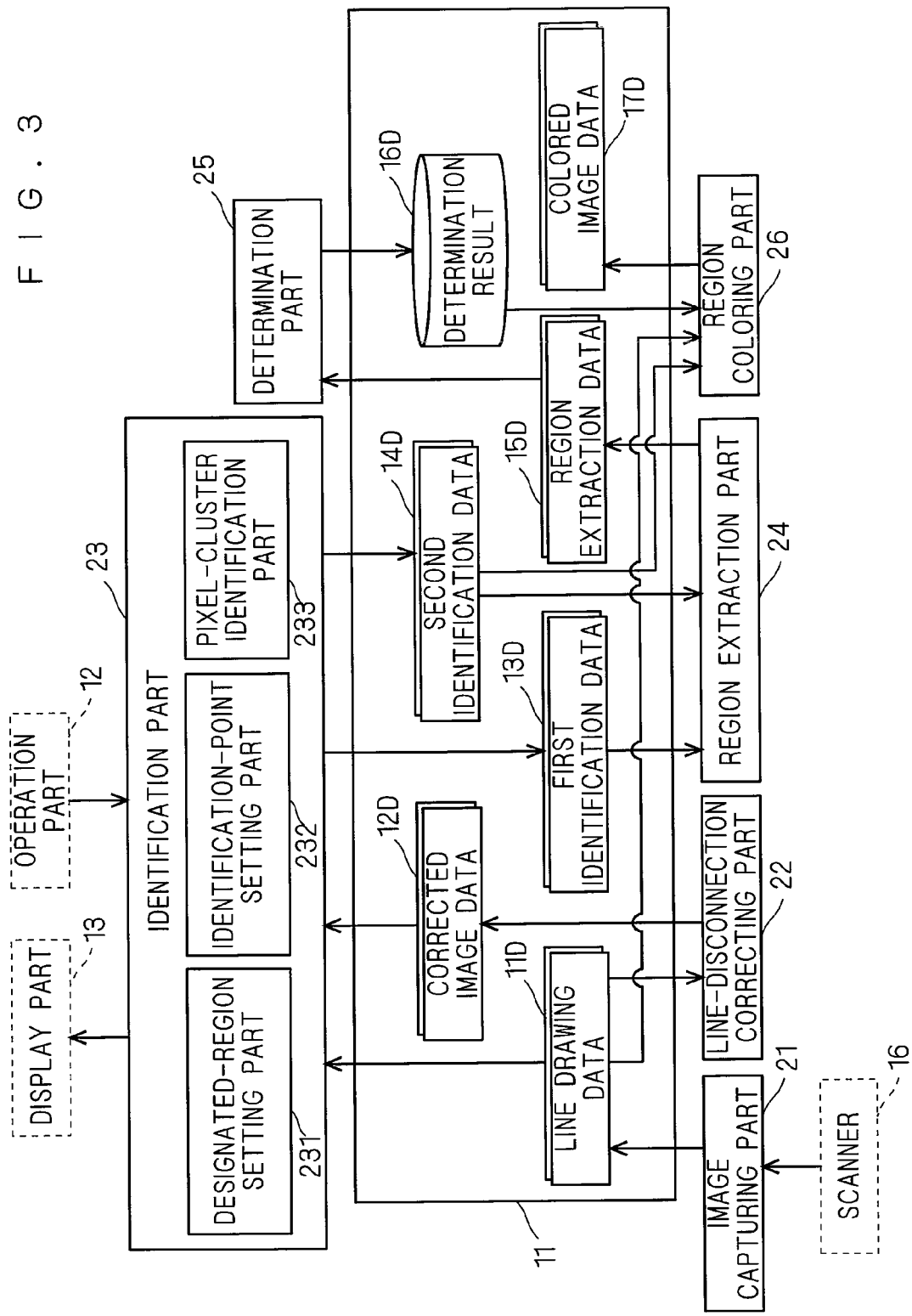
FIG. 3 is a functional block diagram of the line drawing processor with a data flow.

FIG. 3 is a functional block diagram of the line drawing processor 1 with a data flow. An image capturing part 21, a line-disconnection correcting part 22, an identification part 23, a region extraction part 24, a determination part 25, and a region coloring part 26 in FIG. 3 are functional blocks implemented mainly by the operation of the CPU 10 according to the program 2.

(Image Capturing Part 21)

Figure 4:
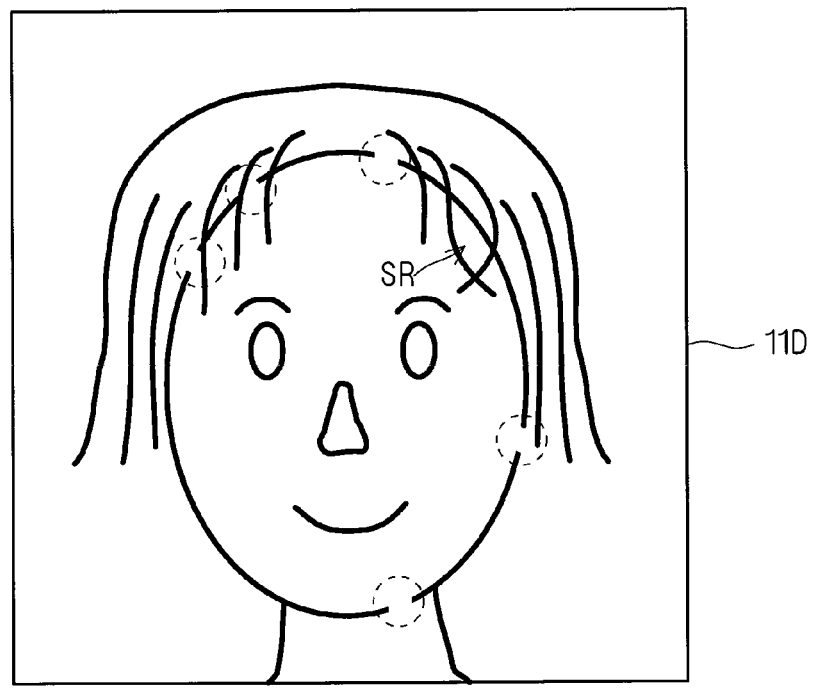
FIG. 4 shows an example of line drawing data.

FIG. 4 shows an example of line drawing data 11D. The image capturing part 21 stores in the storage part 11 the line drawing data 11D which is acquired based on a read signal outputted at the time of reading a line drawing (in the present example, part of a manga) printed on a printing medium (e.g., paper) with the scanner 16. It is however to be noted that the method of acquiring the line drawing data 11D is not limited thereto; the image capturing part 21 may read and acquire the line drawing data 11D recorded on the storage medium 9 by the use of the disk read part 14 or may acquire the line drawing data 11D through the network.

A line drawing to be processed by the line drawing processor 1 may be an analog image (source document) printed on paper or the like in some cases or may be a previously digitized image in other cases. In either case, it is a black-and-white binary image.

In the case of an analog image, the image may be read as a binary image at the time of digitization by photo reading with the scanner 16 or the like. In this case, prior to a designated-region setting process described later, the image is converted into image data representing a multi-level gradation color image using a plurality of bits (e.g., each signal value of R (red), G (green), and B (blue) is represented by 8 bits, i.e., each pixel by 24 bits.)

As another alternative, the image may be read as a multi-level gradation color image from the beginning. Nevertheless, the "multi-level gradation" prior to the actual conversion into a multi-level gradation color image means only that each pixel is represented by a plurality of bits; in practice, only two levels, black and white, are used (for example, a white color has color values of R=255, G=255, and B=255 and a black color has color values of R=0, G=0, and B=0.)

The following description of the present preferred embodiment is given on the assumption that pixels constituting drawing lines and the like are "black" pixels, and pixels constituting solid-color parts (e.g., the background) are "white" pixels. This definition is, however, only for convenience of description, so "black" pixels may for example constitute the background and "white" pixels, drawing lines and the like.

The line drawing data 11D in FIG. 4 mainly represents a "background" region, and "face" and "neck" regions of a character. The forehead portion of the "face" region include a plurality of forelock hairs drawn in drawing lines, some of which form a relatively small region SR separated from the other region. The contour of the face includes a total of five breaks (line disconnections, enclosed in short dashed lines in FIG. 4). In the entire image area of the line drawing, the face region is thus linked to both the background region and the neck region. This preferred embodiment mainly describes the case where, in applying a specific color (e.g., a skin color) to the face region in this line drawing, (1) the same color is applied to the small region SR and the face region; and (2) the same color is applied to the neck region and the face region (in the present example, the region other than the background region in the entire image area).

(Line-Disconnection Correcting Part 22)

Figure 5:
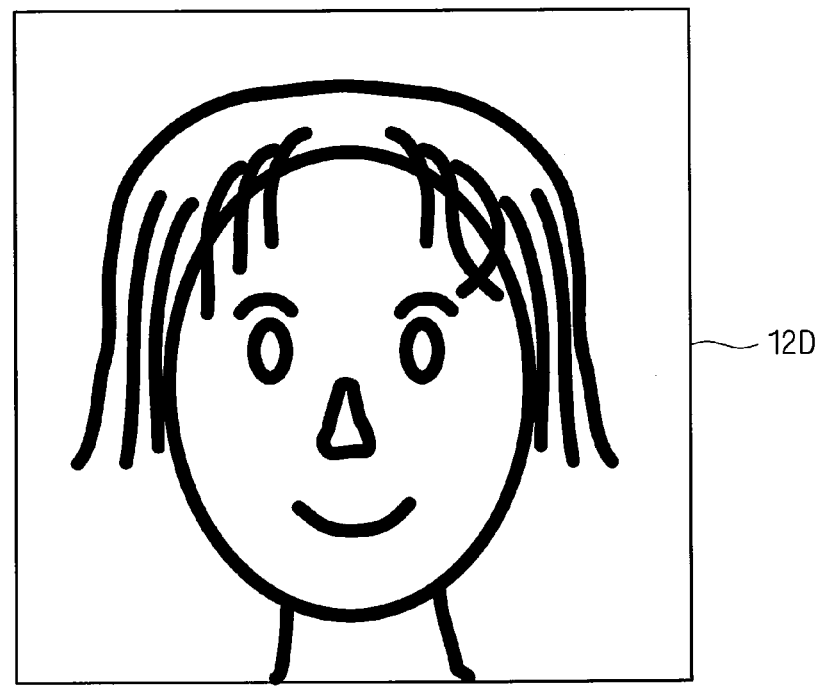
FIG. 5 shows an example of corrected image data obtained by correcting the line drawing data in FIG. 4 for line disconnections.

FIG. 5 shows an example of corrected image data 12D obtained by correcting the line drawing data 11D in FIG. 4 for line disconnections. The line-disconnection correcting part 22 generates the corrected image data 12D by connecting the line disconnections (enclosed in short dashed lines in FIG. 4) in the drawing lines, such as the contour, included in the line drawing data 11D acquired by the image capturing part 21, for correction.

In the present preferred embodiment, the line-disconnection correcting part 22 makes a line-disconnection correction by performing an expansion process of expanding the drawing lines in the line drawing data 11D at a given rate. The expansion process herein refers to the process of converting a "white" pixel of attention in the line drawing data 11D into a "black" pixel if any one of the neighboring eight pixels of the pixel of attention (i.e., the pixels located above and below, to the right and left of, and diagonally above and below the pixel of attention) is a "black" pixel. The process is, however, not only limited to the use of the eight neighboring pixels of the pixel of attention for identification, but may use, for example, only four neighboring pixels (the pixels above and below and to the right and left of the pixel of attention) for identification.

By repetitions of this expansion process a given number of times, the line-disconnection correcting part 22 corrects the line drawing data 11D for line disconnections in the drawing lines representing the contour and line disconnections (including vacant pixels) generated at the time of reading with the scanner 16. The line-disconnection correcting part 22 stores the data (the corrected image data 12D) obtained by expanding the drawing lines in the line drawing data 11D at a given rate, into the storage part 11.

In the present preferred embodiment, the line-disconnection correcting part 22 makes the correction for line disconnections through the expansion process; the present invention is not limited thereto. For example, the correction for line disconnections may be achieved by converting the drawing lines in the line drawing data 11D into thin lines whose line width is one pixel (a reduction in the line width), extracting an end point of each thin line, and connecting nearby end points within a given range to each other by a straight line (or by a curve).

(Identification Part 23)

Referring back to FIG. 3, the identification part 23 mainly includes a designated-region setting part 231, an identification-point setting part 232, and a pixel-cluster identification part 233. The identification part 23 has the function of identifying, for both the line drawing data 11D and the corrected image data 12D, a region to be colored from the remaining region, based on an input operation by the operator. The following is a detailed description of each of those functional blocks.

(Designated-Region Setting Part 231)

The designated-region setting part 231 sets, for either the line drawing data 11D or the corrected image data 12D, a designated region 41R within a region to be colored, based on a given input operation.

Figure 6:
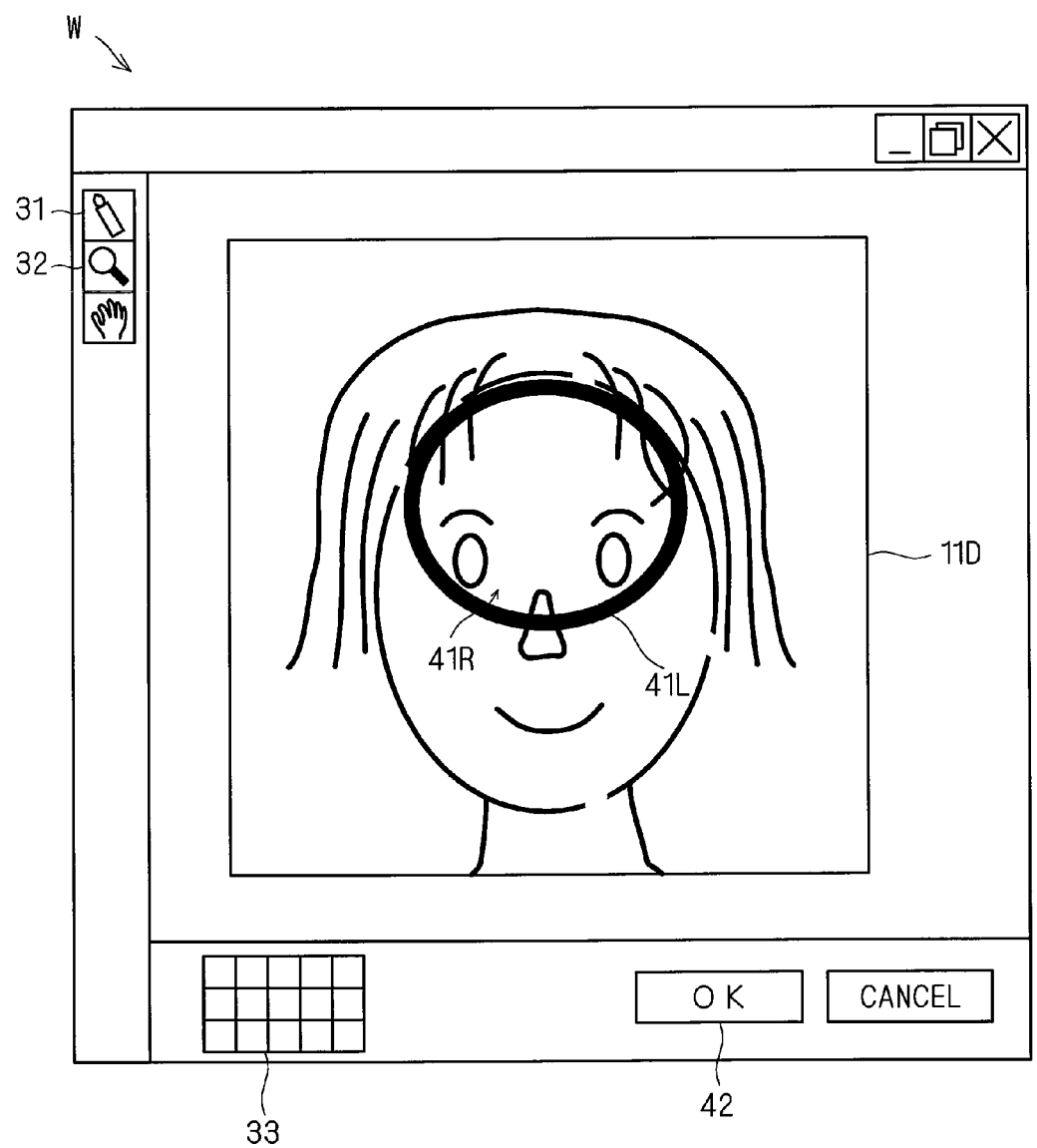
FIG. 6 shows an example of a designated-region setting screen.

FIG. 6 shows an example of a designated-region setting screen W. The designated-region setting part 231 calls up the designated-region setting screen W on the display part 13 and sets the designated region 41R based on a command (instruction) input from the operator.

As illustrated in FIG. 6, the designated-region setting screen W is mainly provided with a brush tool button 31 allowing the operator to draw a curve 41L; an zoom-in tool button 32 for zooming in on an image for display; and a color palette 33 for designating the color of the curve 41L. Although not shown, there is also another button for defining the width of the curve 41L to be drawn.

With the designated-region setting screen W displayed on the display part 13, the operator roughly draws the curve 41L along the contour of a parts region to be colored while visually checking the line drawing data 11D (or the corrected image data 12D). The designated-region setting part 231 set the region defined by this drawn curve 41L as the designated region 41R.

In the example of FIG. 6, the operator draws the curve 41L with a brush tool for the line drawing data 11D in order to color the "face" region of a character. Thus, the designated region 41R is set within the forehead portion of the "face." This curve 41L is drawn with a color (a specific color) which is selected from the color palette 33 and with which the operator wants to color the face region. In other words, the designated region 41R is defined by the curve 41L that includes information on the specific color.

The forehead portion of the character in the line drawing data 11D in FIG. 6 includes a plurality of forelock hairs drawn as previously described. The curve 41L is drawn so that at least part of the small region SR (cf., FIG. 4) formed by the drawing lines representing those forelock hairs is included in the designated region 41R. In the present preferred embodiment, the designated region 41R is defined so as to include part of the small region SR, whereby the application of the same color to both the small region SR and the face region is possible through a coloring process described later.

Although not shown, the designated-region setting screen W is also provided with an erasure tool for erasing the curve 41L. Thus, when having made any mistake in drawing, the operator can make an appropriate correction with the erasure tool.

While in the present preferred embodiment the designated region 41R is set by drawing the curve 41L with the brush tool, the configuration may be such that the designated region 41R is set with a region selection tool (not shown) of a previously-defined given shape (e.g., a circular shape (including an oval figure) or a polygonal shape).

The designated-region setting part 231 may also have the function of, for example, adding an auxiliary line that automatically connects a drawing start point and a drawing end point when the curve 41L drawn by the operator fails to be closed completely (i.e., when the curve 41L does not form a closed region). This allows reliable designation of the designated region 41R even if the operator fails to draw the closed curve 41L.

While in the present example the designated region 41R is set in the line drawing data 11D, the present invention is not limited thereto; the designated region 41R may be set in the corrected image data 12D. In this case, the designated-region setting part 231 displays an image represented by the corrected image data 12D on the designated-region setting screen W, so that the operator can designate the designated region 41R while checking the image.

(Identification-Point Setting Part 232)

Figure 7:
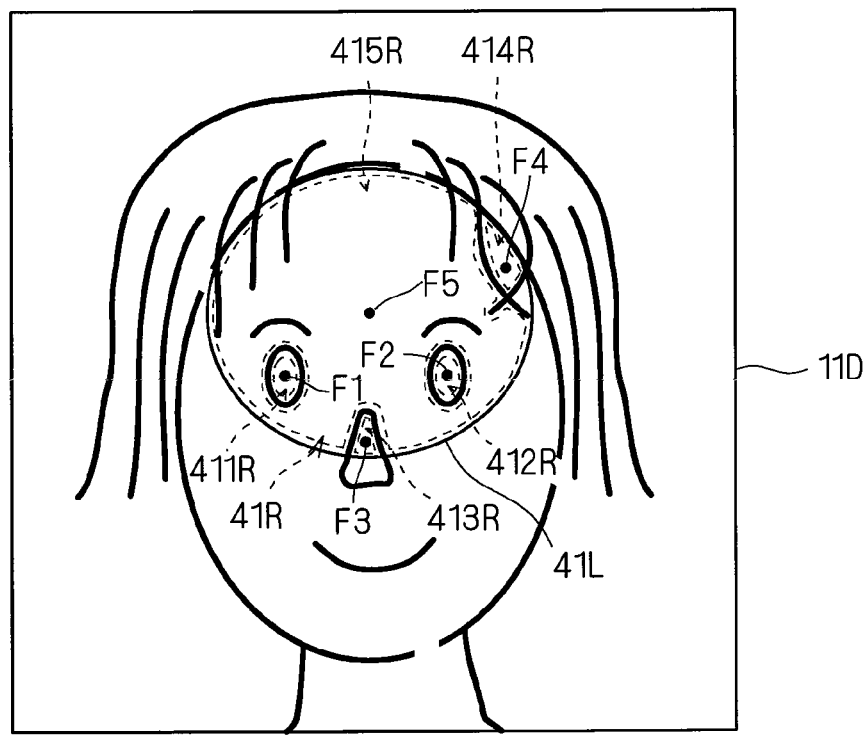
FIG. 7 shows an example of identification points set within a closed region in FIG. 6.
Figure 8:
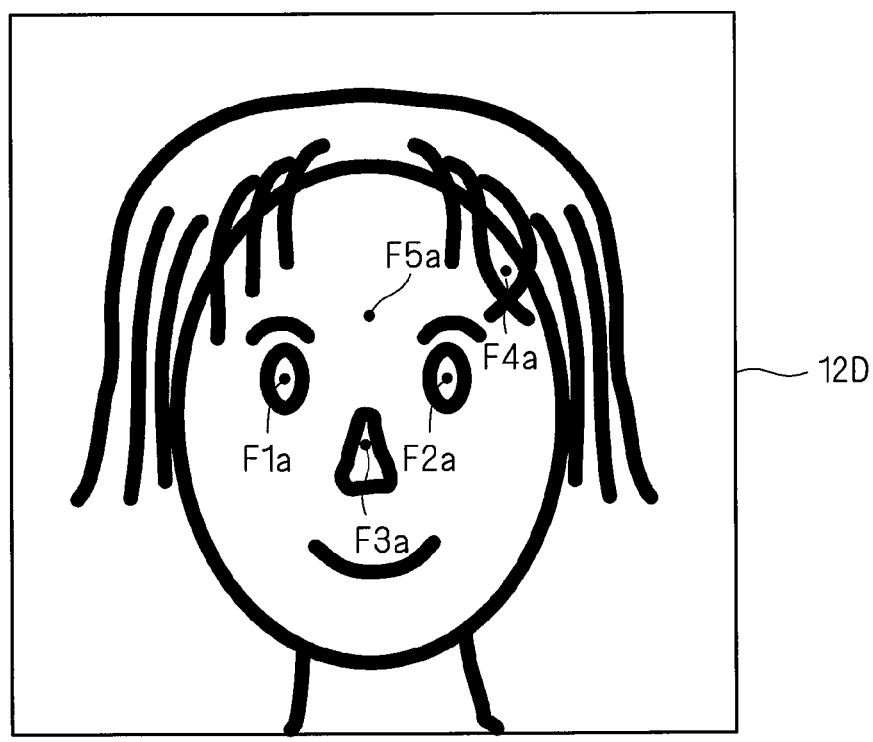
FIG. 8 shows an example of identification points set in the corrected image data in FIG. 5.

FIG. 7 shows an example of identification points F set within the designated region 41R in FIG. 6. FIG. 8 shows an example of identification points F set in the corrected image data 12D in FIG. 5.

The identification-point setting part 232 sets, for both the line drawing data 11D and the corrected image data 12D, an identification point F within each unit closed region forming the designated region 41R. More specifically, in the present preferred embodiment, a centroid (a center position) of each unit closed region defined by the curve 41L defining the designated region 41R and the drawing lines within the designated region 41R is set as an identification point F.

For example in the example of FIG. 7, the identification-point setting part 232 determines the position of a centroids of each of a total of five unit closed regions 411R to 415R: the two unit closed regions 411R and 412R (corresponding to the "eye" regions) and the unit closed region 413R (corresponding to part of the "nose" region) which are defined by the curve 41L and the drawing lines (contours) of the "nose" and "eye" in the line drawing data 11D; the unit closed region 414R (corresponding to the small region SR) formed by the drawing lines of the two forelock hairs; and the unit closed region 415R obtained by excluding the unit closed regions 411R to 414R from the designated region 41R. The identification-point setting part 232 sets the pixels corresponding to those centroids as identification points F1 to F5.

On the other hand, as illustrated in FIG. 8, the identification-point setting part 232 sets identification points F1a to F5a at the positions on the corrected image data 12D which positions correspond to the positions of the identification points F1 to F5 on the line drawing data 11D. More specifically, the identification points F1a to F5a are set so that the pixel positions of the identification points F1 to F5 in the entire image area represented by the line drawing data 11D coincides with those of the identification points F1a to F5a in the entire image area represented by the corrected image data 12D. In this way, the identification-point setting part 232 sets the identification points F for both the line drawing data 11D and the corrected image data 12D.

The description herein gives the case where the designated-region setting part 231 sets the designated region 41R for the line drawing data 11D. However, when the designated-region setting part 231 sets the designated region 41R for the corrected image data 12D, the identification-point setting part 232 should first set identification points F for the corrected image data 12D and then set the corresponding positions on the line drawing data 11D as the identification points F for the line drawing data 11D.

While in the present preferred embodiment the identification-point setting part 232 sets the centroids of the unit closed regions 411R to 415R as the identification points F, the present invention is not limited thereto. For example, the center points of rectangles circumscribed with the boundary lines of the unit closed regions 411R to 415R may be set as the identification points F.

(Pixel-Cluster Identification Part 233)

The pixel-cluster identification part 233 generates first identification data for the line drawing data 11D and second identification data for the corrected image data 12D, the first and second identification data identifying pixel clusters linked to the identification points F and the remaining region other than the pixel clusters from the entire image area.

The "pixel cluster" herein refers to a group of pixels (in the present example, white pixels) having the same gray-scale value as the pixel of an identification point F, i.e., a cluster of pixels linked to an identification point F. In other words, it refers to, in the entire image area represented by either the line drawing data 11D or the corrected image data 12D, a closed region defined by a drawing line or a frame of the image (the outermost pixels) to which an identification point F belongs.

Figure 9:
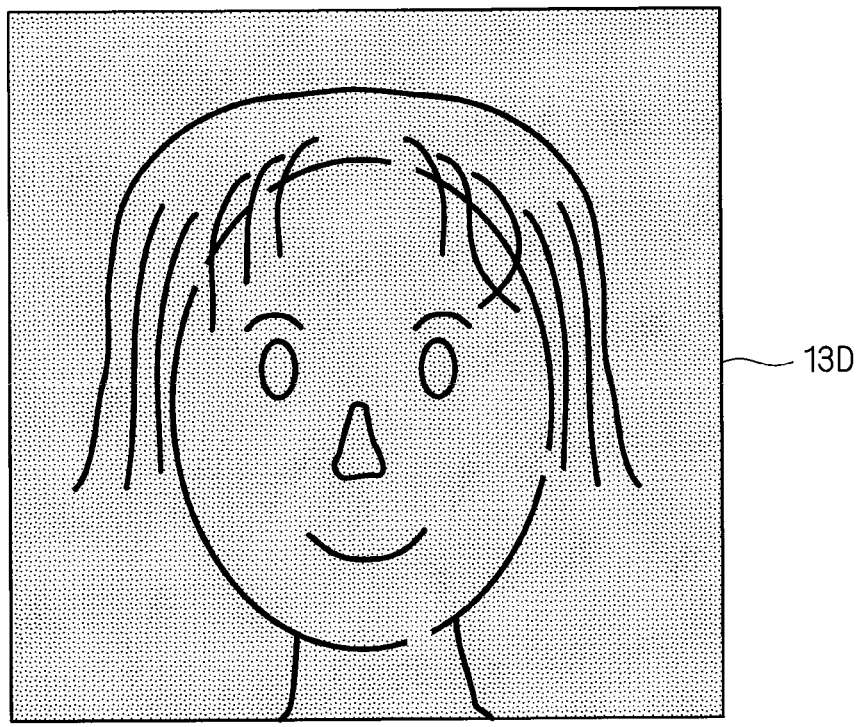
FIG. 9 shows an example of first identification data generated from the line drawing data in FIG. 7.
Figure 10:
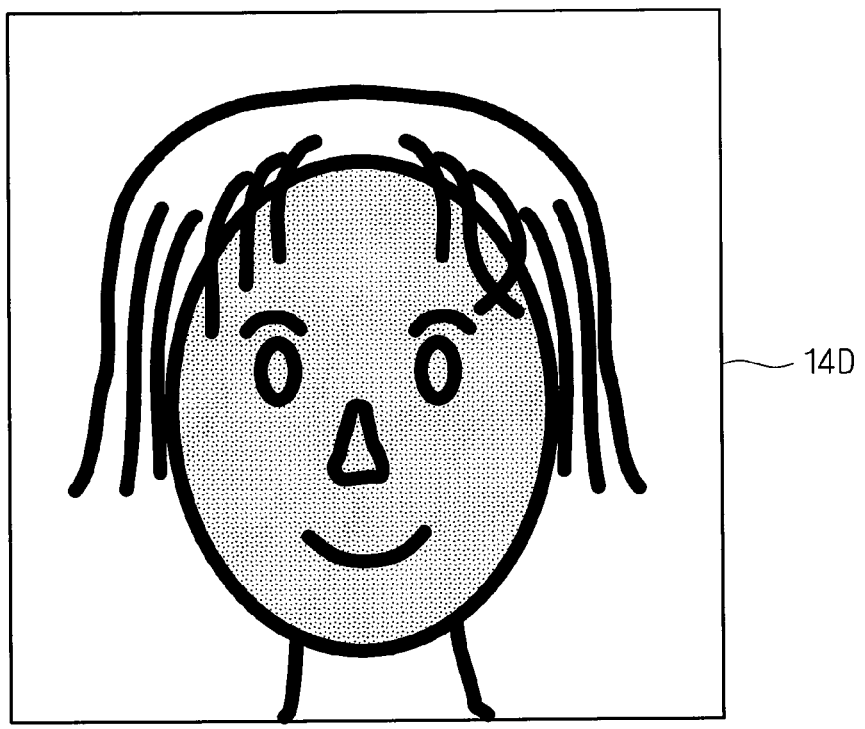
FIG. 10 shows an example of second identification data generated from the corrected image data in FIG. 8.

FIG. 9 shows an example of first identification data 13D generated from the line drawing data 11D in FIG. 7. FIG. 10 shows an example of second identification data 14D generated from the corrected image data 12D in FIG. 8.

In the present preferred embodiment, as illustrated in FIGS. 9 and 10, the pixel clusters linked to the identification points F (F1 to F5 or F1a to F5a) set in either the line drawing data 11D or the corrected image data 12D are colored in a specific color selected at the time of drawing the curve 41L (shown by dots in FIGS. 9 and 10). This allows identification of the pixel clusters and the remaining region other than the pixel clusters from the entire image area.

To be more specific, in the example of FIG. 9, the pixel clusters linked to the identification points F1 and F2 are the "eye" portions (corresponding to the unit closed regions 411R and 412R), the pixel cluster linked to the identification point F3 is the "nose portion" (corresponding to the unit closed region 413R), and the pixel cluster linked to the identification point F4 is the small region SR (corresponding to the unit closed region 414R) surrounded by the drawing lines indicating forehead hairs. Thus, these pixel clusters are colored in the specific color.

The identification point F5, on the other hand, belongs to the "face" region (more specifically, the "face" region other than the "eyes" and the "nose"). However, since the contour of the face has breaks (line disconnections) in part, the pixel cluster linked to the identification point F5 is linked to all the regions including the "face," the "neck," and the "background." For this reason, all of those regions are colored in the specific color.

Through the above identification process, as illustrated in FIG. 9, the first identification data 13D indicating that the entire image area colored in the specific color is generated from the line drawing data 11D.

On the other hand, in the corrected image data 12D, the pixel clusters linked to the identification points F1a and F2a are the "eye" portions, the pixel cluster linked to the identification point F3a is the "nose" portion, and the pixel cluster linked to the identification point F4a is the small region SR formed by the drawing lines indicating forehead hairs. These regions are thus colored in the same way as the case of the line drawing data 11D.

But, as previously described, the corrected image data 12D represents an image corrected for line disconnections, so that the identification point F5a belongs to only the face region (not to the "background"). Thus, as illustrated in FIG. 10, the data (second identification data 14D) indicating that only the face region including the "eye" and "nose" portions and the small region SR is colored, is generated from the corrected image data 12D.

The above coloring process for identification may be performed directly on an image including either the original drawing lines in the line drawing data 11D or the drawing lines corrected for line disconnections in the corrected image data 12D. However, for ease of correction or the like, it is preferable to perform the coloring process on another layer of these image data.

While in the case of the line drawing data 11D, only the inside of the drawing lines shall be colored, it is desirable in the case of the corrected image data 12D that not only the inside of the expanded drawing lines but also the range obtained by the expansion of the pixel cluster linked to each identification point F at a given rate (the same rate at when the drawing lines was expanded in the correction for line disconnections) should be colored.

The first identification data 13D and the second identification data 14D generated as described above by the pixel-cluster identification part 233 are stored into the storage part 11 (cf. FIG. 3). That is all the description of the functional blocks in the identification part 23.

Although not shown, the line drawing processor 1 may be configured such that the identification part 23 displays the first identification data 13D and the second identification data 14D on the display part 13. This allows the operator to visually check the result of coloring, so it becomes easy to re-designate the designated region 41R or to determine where the selected specific color is good or not.

(Region Extraction Part 24)

Referring back to FIG. 3, the region extraction part 24 determines a differential region between the pixel clusters for the first identification data 13D and those for the second identification data 14D and extracts at least one closed region included in the differential region from the corrected image data 12D.

More specifically, in the present preferred embodiment, a region (first identification region) colored in the case of the first identification data 13D and a region (second identification region) colored in the case of the second identification data 14D are overlapped with each other to extract a differential region between the first identification region and the second identification region. The region extraction part 24 further classifies the extracted differential region into at least one closed region, based on the drawing lines in the corrected image data 12D.

Figure 11:
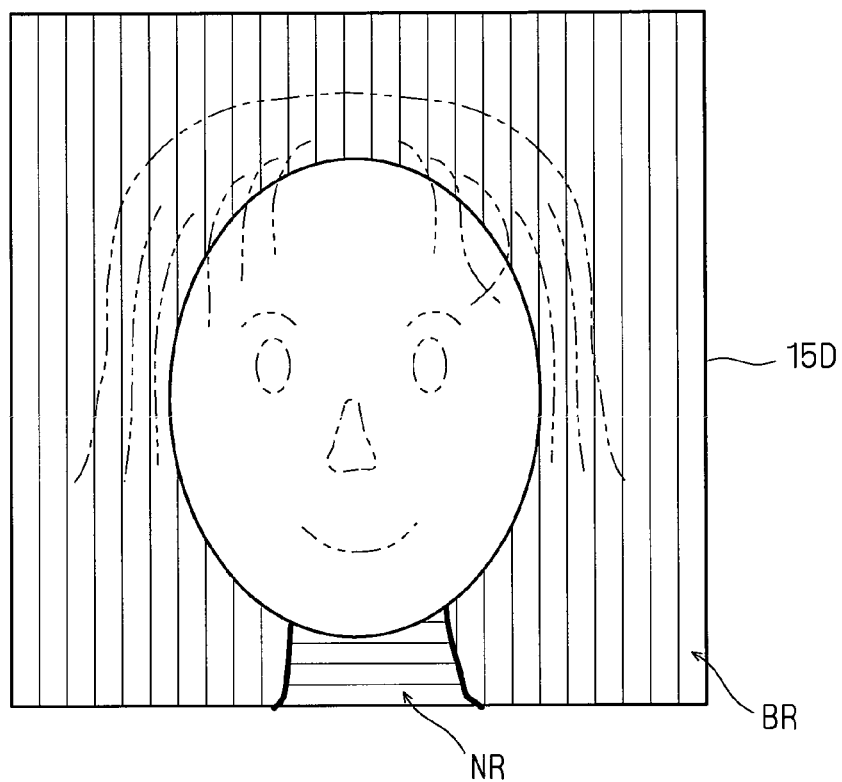
FIG. 11 shows an example of region extraction data generated from the first identification data in FIG. 9 and the second identification data in FIG. 10.

FIG. 11 shows an example of region extraction data 15D generated from the first identification data 13D in FIG. 9 and the second identification data 14D in FIG. 10.

A comparison between the first identification region colored in the first identification data 13D in FIG. 9 and the second identification region colored in the second identification data 14D in FIG. 10 extracts a differential region (in the present example, the region other than the "face" in the entire image area) that is included in the first identification region but not included in the second identification region (cf. FIG. 11).

Then, as illustrated in FIG. 11, the extracted differential region is classified into and extracted as two closed regions NR and BR, the closed region NR corresponding to the "neck" portion (the horizontally hatched portion) and the closed region BR corresponding to the "background" portion (the vertically hatched portion), by the drawing lines in the corrected image data 12D.

The region extraction part 24 stores the data (the region extraction data 15D) that records information including the areas of the extracted closed regions NR and BR (more specifically, the number of pixels forming the closed regions NR and BR) and the like, into the storage part 11 (cf. FIG. 3).

(Determination Part 25)

Referring back to FIG. 3, the determination part 25 determines whether each of the at least one closed region extracted by the region extraction part 24 requires coloring or not, based on a given criterion. More specifically, in the present preferred embodiment, the determination part 25 makes a comparison in area between the pixel cluster (the face region; cf. FIG. 10) identified (in the present example, colored) in the second identification data 14D and each of the at least one closed region (the closed regions NR and BR; cf. FIG. 11) to determine whether each closed region requires coloring or not.

For instance, the ratio of the area of the closed region NR (neck region) in FIG. 11 to the area of the face region is 0.3. On the other hand, the ratio of the area of the closed region BR (background region) to the area of the face region is 2.5. If the ratio of 0.5 or less is used as the threshold for the criterion to determine whether coloring is required or not, only the closed regions NR out of the closed regions NR and BR satisfies the criterion (the ratio (0.3)<the threshold (0.5)). In this case, the determination part 25 thus determines that only the closed region NR requires coloring, and stores data (a determination result 16D) that sets a given flag for the closed region NR, into the storage part 11.

By in this way setting a criterion appropriately, the operator only needs to designate part (the designated region 41R) of the face region to make an automatic determination of whether the same color should be applied to the other part (the neck region) included in the pixel cluster due to a line disconnection or not.

In other words, the line drawing processor 1 according to the present preferred embodiment can apply the same color to the other to-be-colored region, beyond the to-be-colored region designated by the operator, by making use of line disconnections in the drawing lines included in the image of the line drawing data 11D. This allows efficient coloring of a line drawing.

In the above description, the determination part 25 makes a determination based on a comparison in area; the present invention is not limited thereto. For example, the determination may be made based on, for example, the peripheral length (more specifically, the number of pixels forming the contour portion of each of the closed regions NR and BR) or the like. Also in the present preferred embodiment, a comparison is made based on the area of the closed region (the "face" region) identified in the second identification data 14D; the present invention is not limited thereto. For example, the area (or the peripheral length) of the designated region 41R may be used as a basis of comparison.

(Region Coloring Part 26)

Referring back to FIG. 3, the region coloring part 26 applies the same specific color to the closed region determined by the determination part 25 to require coloring, out of the at least one closed region extracted by the region extraction part 24, and the pixel cluster identified in the second identification data 14D.

Figure 12:
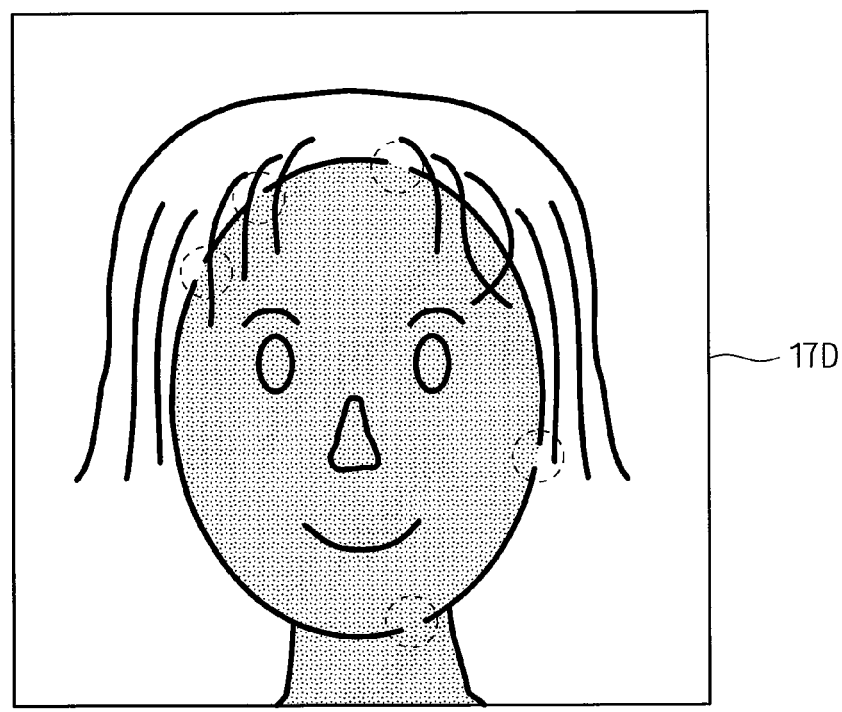
FIG. 12 shows an example of colored image data generated by coloring the line drawing data in FIG. 4.

FIG. 12 shows an example of colored image data 17D generated by coloring the line drawing data 11D in FIG. 4. Referring to the determination result 16D, the region coloring part 26 applies a specific color (the color that the operator selected from the color palette 33 when drawing the curve 41L) to the portion corresponding to the closed region NR (neck region) determined to require coloring in the line drawing data 11D and the portion on the line drawing data 11D which portion corresponds to the face region identified (colored) in the second identification data 14D. This produces, as illustrated in FIG. 12, the colored image data 17D indicating that the same specific color is applied to the face and neck regions.

That is all the description of the configuration and function of the line drawing processor 1. Next, the operation of the line drawing processor 1 is described.

1.2. Operation

Figure 13:
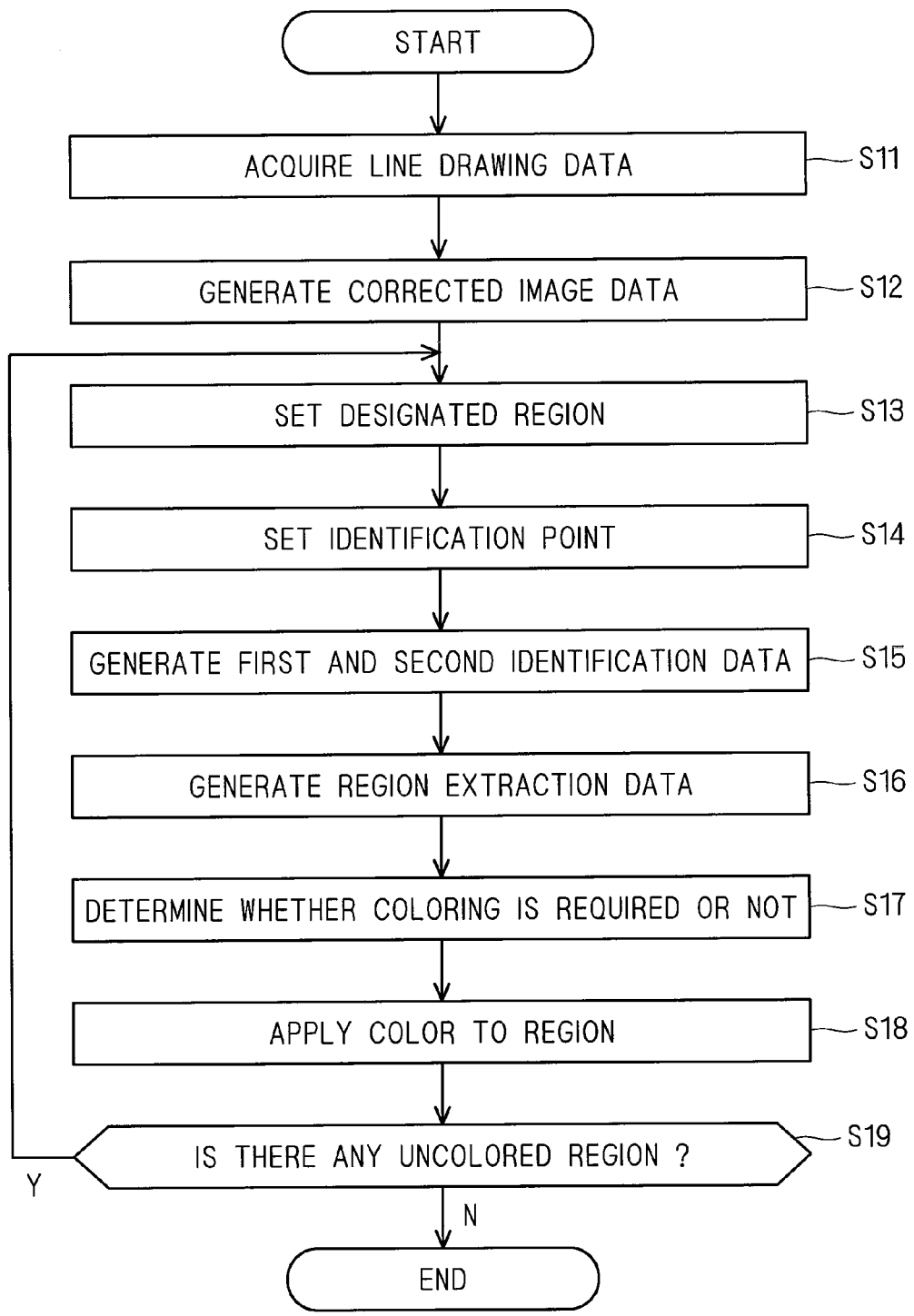
FIG. 13 is a flow chart for the operation of the line drawing processor.

FIG. 13 is a flowchart for the operation of the line drawing processor 1. The following operation is, unless otherwise specified, implemented under control of the CPU 10.

After a given initial setting operation such as reading the setting data (e.g., for the setting of a criterion used by the determination part 25), the line drawing processor 1 acquires the line drawing data 11D (in step S11). As previously described, the line drawing processor 1 may acquire the line drawing data 11D based on the reading of a line drawing printed on a printing medium with the scanner 16 or may acquire the line drawing data 11D through the storage medium 9 and the network.

Upon the acquisition of the line drawing data 11D, the line drawing processor 1 performs the expansion process a given number of times to generate the corrected image data 12D corrected for line disconnections in drawing lines included in the line drawing data 11D (in step S12). Here, the operator can appropriately change the number of repetitions of the expansion process.

Then, the line drawing processor 1 calls up the designated-region setting screen W on the display part 13 (cf. FIG. 6). While visually checking the line drawing data 11D (or the corrected image data 12D) displayed on the designated-region setting screen W, the operator designates a coloring color from the color palette 33 and draws the curve 41L with the brush tool to thereby designate a region to be colored. The line drawing processor 1 sets the region designated by the operator as the designated region 41R (in step S13).

After setting the designated region 41R, the line drawing processor 1 sets, for each of the line drawing data 11D and the corrected image data 12D, identification points F within the designated region 41R (in step S14; cf. FIGS. 7 and 8).

After setting the identification points F, the line drawing processor 1 generates the first identification data 13D that distinguishes pixel clusters linked to the identification points F from the other region (the remaining region other than the pixel clusters in the entire image area) in the line drawing data 11D; and the second identification data 14D that distinguishes pixel clusters linked to the identification points F from the other region in the corrected image data 12D (in step S15; cf. FIGS. 9 and 10). The identification is made by, for example, applying a specific color to the pixel clusters linked to the identification points F so as to be distinguished from the other region.

After the generation of the first identification data 13D and the second identification data 14D, the line drawing processor 1 makes a comparison between the pixel clusters identified in the first identification data 13D and those in the second identification data 14D to obtain a differential region to thereby extract at least one closed region (e.g., the closed regions NR and BR in FIG. 11) included in the differential region from the corrected image data 12D (in step S16).

After extracting at least one closed region in step S16, the line drawing processor 1 determines whether each extracted closed region requires coloring or not (in step S17). More specifically, the line drawing processor 1 makes a comparison in area between the closed region identified in the second identification data 14D and each closed region extracted from the corrected image data 12D. The determination part 25 then determines that those closed regions which have an area ratio equal to or smaller than a given threshold value require coloring.

The determination part 25 sets a flag for the region determined to require coloring in the region extraction data 15D. The determination part 25 also stores the determination result 16D for all the extracted closed regions, into the storage part 11.

After the completion of the determination process, the line drawing processor 1 applies color to a specific region in the line drawing data 11D based on the second identification data 14D and the determination result 16D (in step S18). More specifically, a specific color is applied to a range of the line drawing data 11D that corresponds to the region (e.g., the face region in FIG. 10) identified (colored) in the second identification data 14D and the region (e.g., the neck region in FIG. 11) determined to require coloring in step S16 (cf. FIG. 12). In this coloring process, a colored image which is a layer of the second identification data 14D may be used as it is, or the line drawing data 11D may be colored directly. As another alternative, the coloring process may be performed on the corrected image data 12D.

After the completion of the coloring process, the line drawing processor 1 further determines whether there is any other uncolored region to be colored (in step S19). More specifically, the colored image data 17D colored in step S18 is displayed on the designated-region setting screen W. Accordingly, if there is any other region to be colored (if YES in step S19), the operator inputs a given command. Upon input of the command, the line drawing processor 1 returns again to step S13 and repeats the processes downstream of step S13.

On the other hand, if there is no other region to be colored (if NO in step S19), the operator performs a terminate process such as storing the colored image data 17D. The line drawing processor 1 then completes the coloring process.

That is all the description of the operation of the line drawing processor 1.

1.3. Advantageous Effects

In the line drawing processor 1 according to the present preferred embodiment, when part of the region (e.g., the face region in FIG. 4) to be colored is set as the designated region 41R, the designated region 41R is set so as to include at least part of the small region SR. This allows the small region SR to be colored in the same specific color as the face region.

Even for, for example, a portion sandwiched between thin drawing lines such as forelock hairs in the forelock portion of a character drawn in a manga, the gap between those drawing lines can be colored precisely as long as that portion is included in any pixel cluster linked to any previously-set identification point F.

Since whether a region is to be colored or not is determined automatically based on both a line drawing including line disconnections and a corrected image corrected for the line disconnections, the operator only needs to designate a region to be colored through a simple operation to achieve high-precision and high-efficiency coloring.

2. Second Preferred Embodiment

In the first preferred embodiment, the line drawing processor 1 is configured to apply color to even the other region beyond the region to be colored by the determination part 25 determining whether each at least one closed region extracted by the region extraction part 24 requires coloring or not. The coloring processing method according to the present invention is, however, not limited thereto. In the description of this preferred embodiment, the elements having the same functions as those described in the first preferred embodiment are denoted by the same reference numerals or characters and are not described herein in detail. The same can be said of the other following preferred embodiments.

Figure 14:
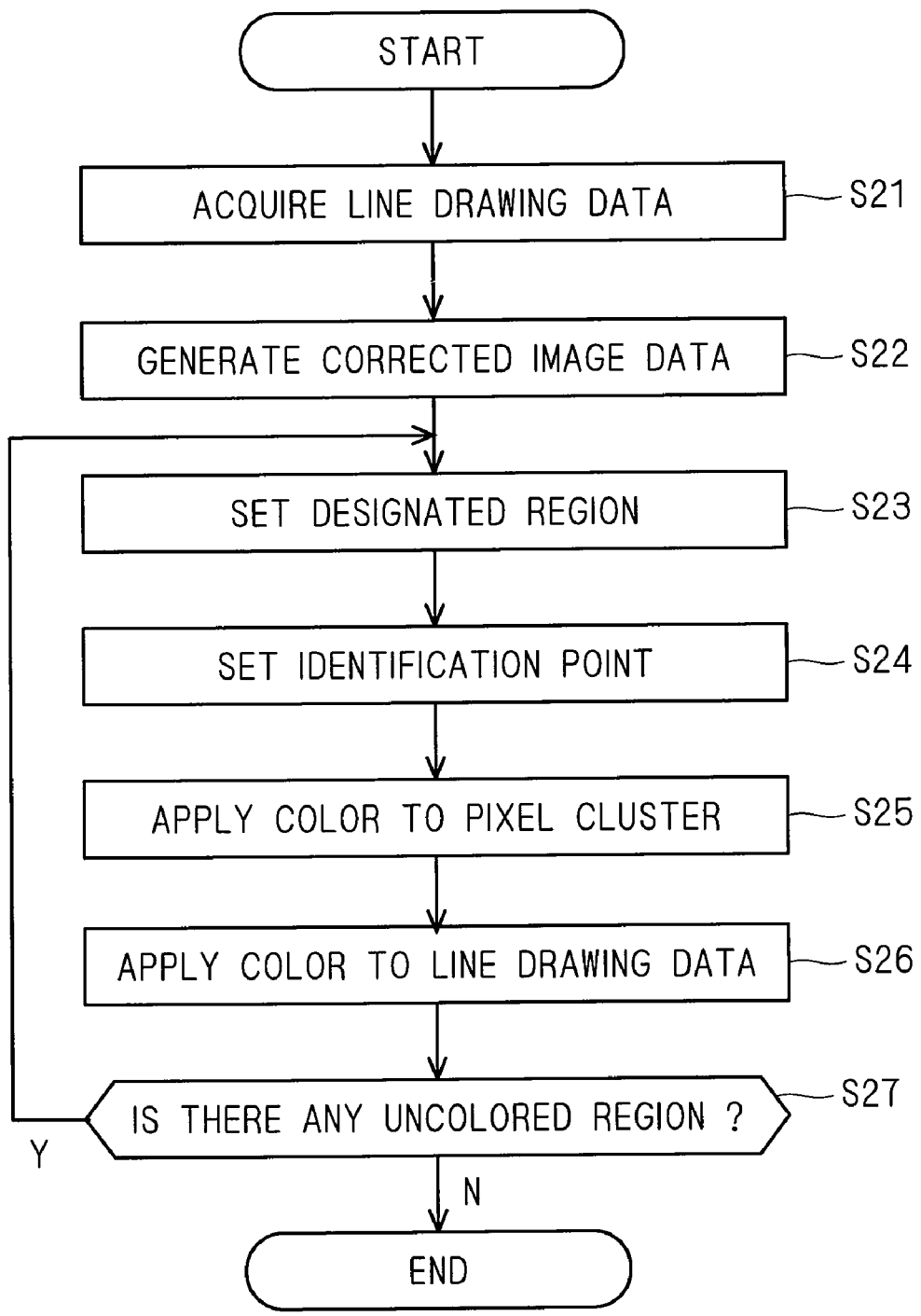
FIG. 14 is a flow chart for the operation of a line drawing processor according to a second preferred embodiment.

FIG. 14 is a flowchart for the operation of a line drawing processor 1 according to a second preferred embodiment. Here, the description is given of the case where, in coloring the face region in the line drawing shown in FIG. 4, the same color as the face region is also applied to the small region SR.

The acquisition of the line drawing data 11D (step S21), the generation of the corrected image data 12D (step S22), and the setting of the designated region 41R (step S23) are identical to the corresponding steps S11 to S13 in the first preferred embodiment.

In this preferred embodiment, after the setting of the designated region 41R, the line drawing processor 1 sets, for only the corrected image data 12D, an identification point F within each unit closed region which forms a corresponding part of the designated region 41R (in step S24; cf. FIG. 8).

After setting the identification points F, the line drawing processor 1 applies a specific color to pixel clusters linked to the identification points F in the corrected image data 12D (in step S25). This coloring is performed on another layer different from the image including the expanded drawing lines in the corrected image data 12D, and the colored region is expanded at the same rate as the expansion rate of the drawing lines. Through the above process, data similar to the second identification data 14D according to the first preferred embodiment, i.e., data indicating that the face region including the small region SR is colored, is acquired. The acquired data is then stored into the storage part 11.

Then, the line drawing processor 1 applies the colored layer obtained by coloring the corrected image data 12D, to the line drawing data 11D to thereby color the line drawing data 11D (in step S26).

After the completion of the coloring process, the line drawing processor 1 further determines whether there is any other uncolored region to be colored (in step S27). More specifically, the line drawing data 11D colored in step S26 is displayed on the designated-region setting screen W. If there is any other region to be colored (if YES), the operator inputs a given command. Thereby, the line drawing processor 1 returns again to step S23 and repeats the processes downstream of step S23. If there is no other region to be colored (if NO), on the other hand, the operator performs a terminate process such as storing the colored line drawing data 11D. Then, the line drawing processor 1 completes the coloring process.

In this preferred embodiment, when part of the region to be colored (the face region) is set as the designated region 41R, the designated region 41R is set so as to include at least part of the small region SR, whereby even the small region SR can be colored in the same specific color as the face region. Although in the present preferred embodiment, unlike the first preferred embodiment, the remaining region other than the region to be colored is not colored because the identification process (step S17) is not performed, a simpler operation can achieve the coloring process more efficiently without the need to select and color a relatively small region one by one.

3. Third Preferred Embodiment

The first preferred embodiment has described the case where the identification-point setting part 232 sets, as an identification point F, the centroid (center position) of each closed region defined by the curve 41L that defines the designated region 41R and the drawing lines included within the designated region 41R in the line drawing data 11D (or the corrected image data 12D). However, the method of setting the identification points F is not limited thereto.

Figure 15:
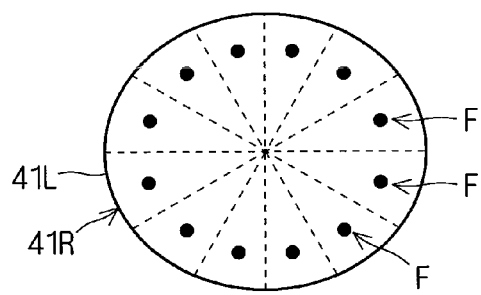
FIG. 15 shows an example of how to set identification points according to a third preferred embodiment.

FIG. 15 shows an example of how to set identification points F according to a third preferred embodiment. As illustrated in FIG. 15, in the present preferred embodiment, after the designated region 41R is set by the operator's command, the identification-point setting part 232 further divides the designated region 41R into a plurality of sections and sets an identification point F for each of the sections.

More specifically, the identification-point setting part 232 according to the present preferred embodiment divides the designated region 41R into a plurality of equal sections (12 equal sections in FIG. 15) and then sets any position within each section (a centroid of each section in FIG. 15) as an identification point F.

For example when the designated region 41R designated by the operator has a shape including an inwardly bowed portion (a recessed portion) like the letter C and if a centroid of each unit closed region is set as an identification point F as in the preferred embodiments described above, there is a possibility that some identification points F may be located outside the designated 41R. However, in the present preferred embodiment, the designated region 41R is divided into a plurality of sections and an identification F is set for each divided section. This allows each identification point F to be set with reliability within the designated region 41R.

4. Fourth Preferred Embodiment

In the preferred embodiments described above, the identification-point setting part 232 sets the identification points F across the full range of the designated region 41R designated by the operator. However, the method of setting the identification points F is not limited thereto.

Figure 16:
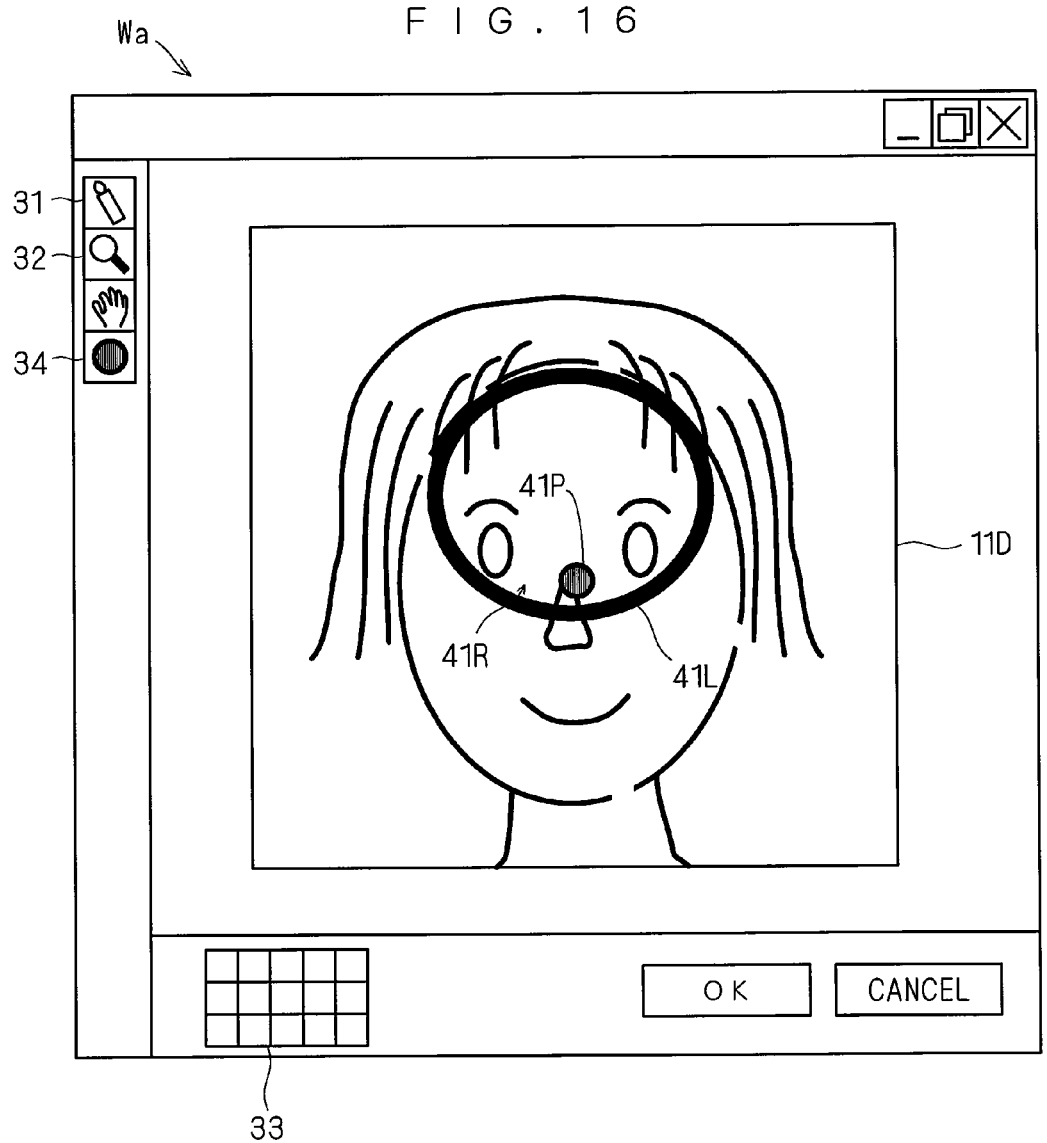
FIG. 16 shows an example of a designated-region setting screen according to a fourth preferred embodiment.
Figure 17:
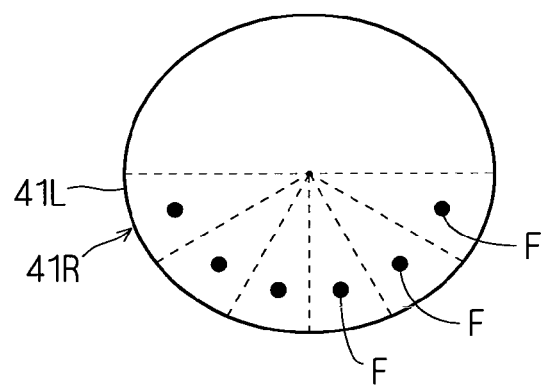
FIG. 17 shows an example of identification points set within a specific closed region shown in FIG. 15.

FIG. 16 shows an example of a designated-region setting screen Wa according to a fourth preferred embodiment. FIG. 17 shows an example of identification points F set within the designated region 41R in FIG. 16. As illustrated in FIG. 16, the designated-region setting screen Wa according to the present preferred embodiment includes a sub-region designation toolbar button 34 for designating a sub-region lopsided in a given direction within the designated region 41R.

More specifically, after designating the designated region 41R by drawing the curve 41L with the brush tool, the operator additionally designates a designation point 41P at a position lopsided in a given direction (in a downward direction in the example of FIG. 16) within the designated region 41R with a sub-region designation tool. Based on a deviation of the designation point 41P from the center position of the designated region 41R, the identification-point setting part 232 recognizes that a sub-region (the lower-half portion of the designated region 41R in the example of FIG. 16) located in that direction has been selected, and then divides the sub-region into a plurality of sections (six equal sections in the example of FIG. 17). Then, the identification-point setting part 232 sets an identification point F at any position (in the present example, a centroid) within each divided section.

For example even when the operator draws the curve 41L off the contour of a parts region to be colored, the sub-region setting tool allows the setting of identification points F within the lopsided range of the designated region 41R in a specific direction. This prevents the identification points F from being set outside the parts region, thus achieving high-precision coloring.

Since the identification points F to be set are reference points for coloring, higher-precision coloring of a line drawing becomes possible by further narrowing down the range within which the identification points F are set, from the previously-set designated region 41R.

The direction designated with the sub-region designation tool is not limited to only one direction, and the line drawing processor 1 may be configured to be capable of designating a plurality of directions. In addition, a sub-region to be designated is not limited to only the half of the designated region 41R and may be a further sectioned smaller region. As another alternative, the sub-region may be a region within a given range with the pixel of the designation point 41P as the center.

While in the present example the designated region 41R is first designated and then the sub-region is designated with the sub-region designation tool, the sub-region may be set automatically with the designation of the designated region 41R based on the position of the start point of drawing in drawing the curve 41L, the direction of drawing, and the like.

Alternatively, the brush tool itself may also be equipped with the ability to serve as the sub-region designation tool. In other words, after drawing the curve 41L with the brush tool, the operator may further draw the designation point 41P at a position lopsided in a given direction within the designated region 41R so that the identification-point setting part 232 can recognize the designation point 41P.

The configuration may also be such that the designated region 41R may be designated to have a characteristic shape and the sub-region may be set based on this characteristic shape. A concrete example thereof is described with reference to FIG. 18.

Figure 18:
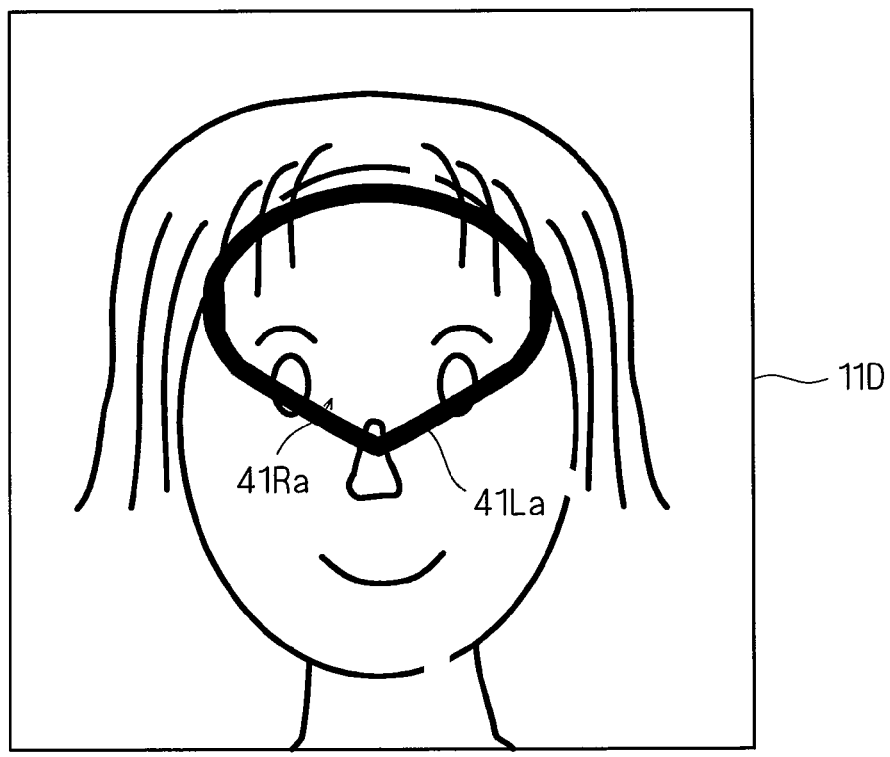
FIG. 18 shows another example of how to designate a region.

FIG. 18 shows another example of how to designate a region. Specifically, a designated region 41Ra is set in such a manner that the operator draws a closed loop 41La including a characteristically shaped portion (in the example of FIG. 18, a closed curve having an oval-shaped sharply projecting portion at the lower part). The identification-point setting part 232 analyzes the drawn closed loop 41La, and based on location information on the characteristic projecting portion (in the present example, the lower side), sets a region lopsided in a given (downward) direction within the designated region 41Ra as a sub-region to thereby set the identification points F within that sub-region.

In this way, the line drawing processor 1 should be configured such that a certain rule is formulated for the designation of the designated region 41R, and that the position of a sub-region within the designated region 41R is determined based on the shape drawn by the operator. This improves the operability of the line drawing processor 1.

5. Modifications

While the preferred embodiments of the present invention have been described so far, the present invention is not limited to the preferred embodiments described above and various modifications are possible.

For example, while in the preferred embodiments described above, the identification part 23 applies a specific color to a closed region for identification, the present invention is not limited thereto; any other method may be used for identification as long as the distinction from the other region is possible.

While in the preferred embodiments described above, the designated region 41R is designated by a requested color (specific color), the present invention is not limited thereto. For example, the line drawing processor 1 may be configured such that the operator may designate a color when the region coloring part 26 applies color to the line drawing data 11D.

In the preferred embodiments described above, at the time of the designation of the designated region 41R, the designated-region setting part 231 may apply a specific color to the inside of the designated region 41R. This ensures the coloring of at least the inside of the designated region 41R designated by the operator.

While in the preferred embodiments described above, when a line drawing is acquired as binary-image data, it is converted into data representing RGB colors in a multi-level gradation, the line drawing data 11D may be processed in the form of binary image data as-is until prior to coloring (i.e., prior to step S18 or S26) and then converted into data representing a multi-level gradation color image at the time of coloring.

In the preferred embodiments described above, the data obtained by subjecting the line drawing data 11D to the expansion process is used as the corrected image data 12D. Alternatively, a reduction process opposite to the expansion process may be performed after the expansion process, whereby image data including lines of an original width may be used as the corrected image data 12D. In this case, the expansion of pixel clusters during the identification process (in the preferred embodiments described above, the expanded pixel clusters are colored) can be omitted.

Still further, the configurations described in the aforementioned preferred embodiments and the modifications may be combined as appropriate unless otherwise contradicted by each other.

While the invention has been shown and described in detail, the foregoing description is in all aspects illustrative and not restrictive. It is therefore understood that numerous modifications and variations can be devised without departing from the scope of the invention.

What is claimed is:

1. A line drawing processor for applying color to a line drawing, comprising:
    an acquisition part configured to acquire line drawing data;
    a line-disconnection correcting part configured to correct line drawing data representing a line drawing of a line disconnection in the line drawing to generate corrected image data;
    a designated-region setting part configured to set, for either said line drawing data or said corrected image data, a designated region within an area to be colored, based on a given input operation;
    an identification-point setting part configured to set, for said corrected image data, an identification point within each unit closed region which forms a corresponding part of said designated region, and to set, for both said line drawing data and said corrected image data, an identification point within a unit closed region which forms a corresponding part of said designated region;
    a region coloring part configured to apply a specific color to a pixel cluster, the pixel cluster being a group of pixels having the same gray-scale value as the pixel of the identification point and linked to said identification point set within said each unit closed region, in an entire image area;
    a pixel-cluster identification part configured to generate first identification data for said line drawing data and second identification data for said corrected image data, said first and second identification data identifying, from the entire image area, both a pixel cluster linked to said identification point and the remaining region other than said pixel cluster;
    a region extraction part configured to obtain a differential region between said pixel cluster identified in said first identification data and a second cluster identified in said second identification data to extract at least one closed region included in said differential region from said corrected image data; and
    a determination part configured to determine whether each of said at least one closed region requires coloring or not, based on a given criterion,
    wherein said region coloring part applies the same specific color to any of said at least one closed region determined by said determination part as requiring coloring and the second pixel cluster identified in said second identification data.

2. The line drawing processor according to claim 1, wherein said pixel-cluster identification part applies coloring to said pixel cluster to distinguish said pixel cluster from said remaining region for each of said line drawing data and said corrected image data.

3. The line drawing processor according to claim 1, wherein said determination part determines whether said coloring is required or not based on a comparison between the second pixel cluster identified in said second identification data and each of said at least one closed region.

4. The line drawing processor according to claim 1, wherein said designated-region setting part sets a designated region defined by a curve in said specific color.

5. The line drawing processor according to claim 1, wherein said identification-point setting part regards, as said unit closed region, each closed region defined by a curve defining said designated region and a drawing line included in said designated region, and sets a centroid of each said unit closed region as said identification point.

6. The line drawing processor according to claim 1, wherein said identification-point setting part divides said designated region into a plurality of sections and sets an identification point for each of said plurality of sections.

7. The line drawing processor according to claim 1, wherein said identification-point setting part includes a sub-region designation part configured to designate a sub-region lopsided in a given direction within said designated region, and said identification-point setting part sets said identification point within said sub-region.

8. The line drawing processor according to claim 1, wherein said line-disconnection correcting part includes an expansion part for expanding a drawing line included in said line drawing data at a given rate.

9. A line drawing processing method for applying color to a line drawing with a processor, the line drawing processing method comprising steps of:
- (a) acquiring line drawing data;
- (b) correcting said acquired line drawing data representing a line drawing of a line disconnection in the line drawing to generate corrected image data;
- (c) setting, for either said line drawing data or said corrected image data, a designated region within an area to be colored, based on a given input operation;
- (d) setting, for said corrected image data, an identification point within each unit closed region which forms a corresponding part of said designated region set in said step (c) and setting, for both said line drawing data and said corrected image data, an identification point within a unit closed region which forms a corresponding part of said designated region;
- (e) applying a specific color to a pixel cluster, the pixel cluster being a group of pixels having the same gray-scale value as the pixel of the identification point and linked to said identification point set within said each unit closed region, in an entire image area;
- (f) generating first identification data for said line drawing data and second identification data for said corrected image data, said first and second identification data identifying both the pixel cluster linked to said identification point and the remaining region other than said pixel cluster, from the entire image area;
- (g) obtaining a differential region between said pixel cluster identified in said first identification data and a second pixel cluster identified in said second identification data to extract, from said corrected image data, at least one closed region included in said differential region; and
- (h) determining whether each of said at least one closed region requires coloring or not, based on a given criterion, wherein, in said step (e), the same specific color is applied to any of said at least one closed region determined in said step (h) as requiring coloring and the second pixel cluster identified in said second identification data.

10. A non-transitory, computer-readable storage medium storing a computer-readable program therein, said computer-readable program to be executed by a processor serving as a line drawing processor, the execution of said computer-readable program by the processor performs functions, including functions to:
- (a) acquire line drawing data;
- (b) correct said line drawing data representing a line drawing for a line disconnection in the line drawing to generate corrected image data;
- (c) set, for either said line drawing data or said corrected image data, a designated region within an area to be colored, based on a given input operation;
- (d) set, for said corrected image data, an identification point within each unit closed region which forms a corresponding part of said designated region, and set, for both said line drawing data and said corrected image data, an identification point within a unit closed region which forms a corresponding part of said designated region;
- (e) apply a specific color to a pixel cluster, the pixel cluster being a group of pixels having the same gray-scale value as the pixel of the identification point and linked to said identification point set within said each unit closed region, in an entire image area;
- (f) generate first identification data for said line drawing data and second identification data for said corrected image data, said first and second identification data identifying both a pixel cluster linked to said identification point and the remaining region other than said pixel cluster, from the entire image area;
- (g) obtain a differential region between said pixel cluster identified in said first identification data and a second pixel cluster identified in said second identification data to extract at least one closed region included in said differential region from said corrected image data; and
- (h) determine whether each of said at least one closed region requires coloring or not, based on a given criterion, wherein in said step (e), the same specific color is applied to any of said at least one closed region determined by said step (h) as requiring coloring and the second pixel cluster identified in said second identification data.

* * * * *